Patented Oct. 9, 1945

2,386,333

UNITED STATES PATENT OFFICE 2,386,333

PROCESS FOR THE RECOVERY OF HYDROCARBONS

Lloyd C. Morris, Bartlesville, Okla., assignor to Phillips Petroleum Company, a corporation of Delaware No Drawing. Application April 6, 1942,
Serial No. 437,901

7 Claims. (Cl. 260—666)

This invention relates to a process for the recovery of hydrocarbons, and particularly to the separation and recovery of diolefins and cyclic olefins from hydrocarbon mixtures containing the same. More specifically, it concerns a chemical process for the above-mentioned separation.

Various hydrocarbon conversion processes, such as the high temperature, low pressure cracking of low-boiling paraffin hydrocarbons, produce complex mixtures of higher and lower boiling compounds which may comprise aliphatic paraffins, olefins and diolefins, cyclic olefins and diolefins, naphthenes and aromatics. Such mixtures represent in many instances sources of valuable raw materials for a variety of uses when significant amounts of the materials can be separated economically in a suitably pure form. This is particularly true of aliphatic conjugated diolefins which have important uses in the preparation of high molecular weight polymers. Also, cyclic olefins are becoming increasingly important in various chemical syntheses.

Efficient fractionation of such complex hydrocarbon mixtures ordinarily results in separation into portions consisting essentially of hydrocarbons of the same number of carbon atoms and exhibiting boiling ranges of from about 10 to 30° F. Further precise fractionation of the primary cuts may effect appreciable segregation of the individual components, but ultimate separation by this method is expensive and often impractical because of the closeness of boiling points and sometimes the formation of constant boiling hydrocarbon mixtures or azeotropes.

Azeotropic distillation of such mixtures, usually after preliminary segregation, using various added substances as entraining liquids has been proposed, and may produce separation of species, for example, paraffins from olefins and/or olefins from diolefins. Such methods, however, are inherently expensive because of the equipment and operating costs, and introduce an additional source of product contamination in the form of traces of difficultly removable entraining liquid. Thus, many entraining liquids can unfavorably alter the polymerization characteristics of diolefin concentrates and entail an additional purification step.

Chemical separation methods offer many possible advantages such as simple, low-cost operation and recovery of substantially uncontaminated product. However, the means heretofore suggested for chemical separation processes have lacked specificity when applied to mixtures of the complex nature of those which are considered herein.

An object of this invention is to provide a process for the recovery of hydrocarbons from metal salt-hydrocarbon complexes of varying thermal stability. Another object is to provide a simple process for such recovery whereby different types of hydrocarbons may be separately obtained. A further object is to provide for the separation of different unsaturated hydrocarbons from a complex hydrocarbon mixture by the formation of insoluble cuprous halide-hydrocarbon complex compounds, followed by decomposition of said complex compounds at different temperature levels. A further object is to provide a chemical process for separation of the components of hydrocarbon mixtures consisting of compounds of such closely adjacent boiling points that practical separation by fractional distillation is difficult or impossible. Yet another object is to provide for the concentration, or separation in substantially pure form if desired, of cyclic olefins such as methyl cyclopentene, cyclohexene, etc., and aliphatic diolefins of the butadiene type such as butadiene, isoprene, etc., one from the other and from hydrocarbons of other types. Another object is to provide a process for the manufacture of diolefin concentrates for use in synthetic chemistry, for polymerization to useful products, and the like. Other objects will be apparent from the following description.

It has been proposed to employ various forms of inorganic salt reagents, particularly salts of the heavy metals of groups I and II of the periodic system, to segregate aliphatic olefins and diolefins from hydrocarbon mixtures. For example, salts such as cuprous halides in solution and/or suspension or in solid form, are capable of a thermally reversible addition reaction with aliphatic olefins and conjugated diolefins, and the latter-named products are obtained and are separable as insoluble precipitates. Following such precipitation and separation steps, the hydrocarbons are recovered by thermal decomposition of the complex.

It has been noted that aliphatic olefins react with cuprous halides to form complex compounds soluble in an aqueous reagent phase, so that separation of the aliphatic olefins and the aliphatic diolefins is thereby effected. However, in my co-pending application Serial No. 437,903, filed of even date herewith, I have disclosed that cyclic olefins also form insoluble reaction products with cuprous halides, so that this type of compound is not readily separated from aliphatic diolefins by means of cuprous halide reagents in a simple precipitation step as has heretofore been assumed. This means, in turn, that separation of pure aliphatic diolefins from complex hydrocarbon mixtures also containing cyclic olefins is not possible by simple precipitation with cuprous halides followed by ordinary decomposition of the complex to recover purified hydrocarbons.

I have now discovered that there is sufficient difference in the thermal stability of the coprecipitated cuprous halide addition complexes of the hydrocarbons to enable the separation of the hydrocarbon components by the method of the present invention as described in detail below. I have found that the cyclic olefin complex is less thermally stable than the aliphatic diolefin complex, and that cyclic olefins can be separated from aliphatic diolefins by a technique of fractional decomposition of the mixed complex precipitates.

My method of making such separation comprises the basic steps of (1) contacting the hydrocarbon fluid to be treated with a cuprous halide reagent; (2) separating the precipitated insoluble complex compounds from the unreacted hydrocarbon and reagent phases; (3) heating the mixed precipitate at several temperature levels above the point of initial decomposition; and (4) separately recovering the hydrocarbon evolved at each of the different temperature levels. The hydrocarbon forming the least stable complex is thus evolved in relatively pure form at the lowest decomposition temperature levels, while the hydrocarbon forming the most stable complex is evolved in relatively pure form at the highest temperature levels.

The cuprous halide reagents may comprise aqueous solutions of cuprous chloride or bromide with solutions such as the chlorides of the alkali metals or ammonia to aid in dissolving the cuprous salts. A minor proportion of a reducing agent such as sodium bisulfite, hydroxylamine hydrochloride, or the like may be incorporated in the reagent to assist in prevention of oxidation of the cuprous salt. The cuprous halide concentration may be limited to the solubility of the cuprous halide, or excess solid cuprous halide may be suspended in the aqueous medium. Still another possible modification is the solid-type reagent wherein the cuprous halide is dispersed and/or adsorbed on the surface of various solid dispersing agents or carriers. These latter materials may include bauxite, fuller's earth, asbestos, and the like. Or solutions of cuprous halide in certain olefinic liquids may be employed.

The hydrocarbon fluid is intimately contacted with the cuprous halide reagent under conditions promoting complete precipitation of all insoluble complex compounds. When employing a clear aqueous reagent solution or a pumpable suspension, the contact between hydrocarbon fluid and reagent may be obtained by mixing devices such as turbo-mixers, centrifugal pumps, jet mixers, etc. The reaction to form the cuprous halide complex is rapid, and contact time in liquid phase treating may vary from 10 minutes to one hour or more, depending on the concentration of reactive hydrocarbons, efficiency of contact, etc. When gas phase contact is employed with either liquid or solid reagents, contact times are adjusted to obtain substantially complete reaction.

Temperatures favorable to complex formation are usually below about 80° F., and a preferred range which gives rapid reaction is between about 30 and 45° F. Sufficient pressure is usually applied to maintain the hydrocarbon phase unchanged, and to secure adequate mixing between liquid hydrocarbons and aqueous reagents when these are used.

The separation of the solid addition complexes precipitated by the reaction may be accomplished by any suitable means which performs the desired segregation of the precipitate from the unreacted hydrocarbons and/or the aqueous reagent. Such means may include filtration, centrifuging, decantation, or the like. In case of a solid type reagent, the reagent itself may serve as a filter aid in the separation and retention of the complexes. The separated precipitate may be treated directly to recover the hydrocarbons or it may be further freed of absorbed, unreacted hydrocarbons, if desired, by flushing with an inert non-condensible gas, or by washing with butane or other inert liquid easily removable from the washed material or from the recovered hydrocarbon. This washing operation is performed at temperatures below those causing decomposition of the complex compounds.

In decomposing the complex compounds to release and recover the hydrocarbons, I have discovered that the least stable complex is ordinarily decomposed at a fairly rapid rate at a temperature of about 125° F. and at atmospheric pressure. Higher temperatures up to about 200° F. or higher at atmospheric pressure produce decomposition of the most stable complexes. The raising or lowering of the pressure will generally raise or lower these temperatures. In accordance with the difference in the stability of the complexes, the fractional decomposition involves heating the total precipitate at a plurality of temperature levels between about 125 and 200° F., and separately recovering the hydrocarbons released at each level. For example, I may use equal increments within this range and heat the precipitate successively at 125, 150, 175, and 200° F. The length of time the complexes are held at each temperature level will depend on the efficiency of the heating means and ordinarily varies from about 10 minutes to about two hours or until no further evolution of hydrocarbon occurs. As each fraction of hydrocarbons is evolved, it is condensed or otherwise segregated, sometimes with corresponding fractions from previous treatments by the process.

In general, the cyclic olefins predominate in the hydrocarbons released at 125° F., or the lowest temperature level, and the aliphatic diolefins predominate in the hydrocarbons released at 175° F. and above. In fact, when the decomposition is carefully carried out at at least two and preferably at three or more temperature levels, the last fraction or fractions recovered at temperatures above about 175° F. may consist of substantially pure diolefins. The initial and intermediate fractions recovered at lower temperatures may comprise substantially pure cyclic olefins or various hydrocarbon mixtures, and may be utilized in other separation processes or returned to the original charge mixture for further fractionation and/or retreatment by the present process if necessary.

The number of temperature levels which may be employed in this procedure of fractional decomposition will depend on the composition of the original hydrocarbon mixture and the extent to which the separation between the less stable and the more stable complexes is desirable. The extremes of such considerations may be exemplified by one case in which two temperature levels, 150 and 200° F., are employed to give a rough separation, and another case in which 10° F. temperature increments are employed to give a sharp separation and several fractions of high purity hydrocarbons. These and other aspects of the present invention are further illustrated by the exemplary operations described below.

*Example I*

A sample of closely fractionated so-called aromatic oil comprising $C_5$ hydrocarbons obtained from low-pressure cracking of a paraffinic charge stock had a boiling range of 106–120° F. Analysis showed the presence of 22 per cent diolefin and 78 per cent cyclopentene; cyclopentadiene and acetylenes were absent. This sample was intimately mixed at 40° F. with an aqueous solution of cuprous chloride and ammonium chloride containing an excess of cuprous chloride over that necessary to react with all of the hydrocarbons. After the reaction was complete, the precipitate was filtered and washed with butane under pressure. Decomposition was effected by heating the complex for two hours at 25° F. intervals between 125 and 200° F., and segregating the hydrocarbons released at each temperature level. Hydrocarbon obtained at 125° F. was about 90 per cent cyclo-olefin. The portions obtained at temperatures above 175° F. were 98 per cent diolefin.

*Example II*

A liquid hydrocarbon mixture containing $C_5$ paraffins, aliphatic olefins, cyclopentene, isoprene, and piperylene was subjected to an initial precise fractionation which separated a lower-boiling fraction containing the major portion of the isoprene along with normal pentane and pentenes. The higher boiling fraction contained n-pentane, pentenes, cyclopentene, and piperylene together with some isoprene. This higher boiling fraction was contacted in a centrifugal mixer with an excess of a cuprous chloride-ammonium chloride solution in water, stabilized with a minor amount of sodium bisulfite. The reaction mixture was held at 35–45° F. until complex precipitation was substantially complete. The hydrocarbon and aqueous layers were filtered off, and the precipitate was brought to 125° F. Hydrocarbons desorbed at 125° F. were predominately cyclopentene and discarded, and a fraction desorbed at 150° F. was retained for retreatment. The remainder of the complexes were then decomposed at about 200° F. to recover the aliphatic diolefins. The diolefin concentrate was topped in a final fractionation to obtain substantially pure piperylene.

It will be obvious to those skilled in the art that the present invention is applicable to a wide variety of hydrocarbon mixtures including aliphatic diolefins and cyclic olefins of four or more carbon atoms. Thus, butadiene, isoprene, and piperylene may be segregated as a mixture and later separated by fractionation. It is often preferred in treating said mixtures to first remove such reactive materials as carbon monoxide, acetylene, and/or acetylenic compounds which otherwise consume the cuprous halide reagent. The lower boiling members of this class are ordinarily separated by preliminary fractionation. Cyclic diolefins are also removable by fractionation following their conversion to polymeric form, either before or after contact with the cuprous halide reagent, although preferably before.

Not only may cyclic olefins and aliphatic diolefins be separated as described, but a further separation into hydrocarbon types may be made when aliphatic olefins are also present, by use of aqueous cuprous halide reagents as described in my co-pending application Serial No. 437,904, filed of even date herewith. Thus, as explained therein, a hydrocarbon mixture comprising cyclic olefins, aliphatic diolefins, aliphatic olefins, and one or more paraffins, naphthenes, and/or aromatics, may be separated into (1) cyclic olefins and (2) aliphatic diolefins by the processes herein described, and furthermore into (3) aliphatic olefins and (4) paraffins, naphthenes, and/or aromatics. The latter separations are accomplished by solution of the aliphatic olefins in the aqueous cuprous halide reagent in the form of soluble complexes which may be decomposed by heating and reduction of pressure to liberate aliphatic olefins; paraffins, naphthenes, and/or aromatics are recovered unreacted.

The cuprous halide reagents employed in the present process may be recovered and recycled by the provision of suitable elements of process equipment. Various devices for re-use of the cuprous halide residues may be utilized, and cyclic operations are possible with the provision of several contactors, and sufficient auxiliary equipment. Either cuprous chloride or bromide may be used in the reagent composition, with the former usually preferred because of somewhat more rapid reaction rate.

While the foregoing has been relatively specific to the separation of co-precipitated cyclic olefins and conjugated aliphatic diolefins, and specific examples of such operations have been provided, it will also be obvious that the principles of the invention are of general application to a much broader field. Thus, in handling any mixture of cuprous halide or other metal salt complex compounds similar to those described which exhibit differing thermal stabilities, the present invention may be employed to fractionally decompose said complexes and separately recover the organic components of the decomposed complexes. Such an extension of the present process requires only a knowledge of the relative stability of the compounds involved, and the mechanical means to apply the invention.

I claim:

1. A process for the separate recovery of aliphatic conjugated diolefins and cyclic olefins from hydrocarbon mixtures containing the same and other close-boiling hydrocarbons which comprises contacting said mixture with a cuprous halide reagent and effecting formation of a mixture of solid complexes of the cuprous halide with the aliphatic conjugated diolefin and the cyclic olefin in said hydrocarbon mixture, heating said mixture of solid complexes at a series of progressively higher temperature levels from the temperature of initial complex decomposition to the temperature of substantially complete hydrocarbon evolution, segregating the cyclic olefin liberated at an initial temperature level, and segregating the aliphatic conjugated diolefin liberated at a later temperature level.

2. In a process for the separation of the components of a hydrocarbon mixture comprising an aliphatic conjugated diolefin and a cyclic olefin by contacting said mixture with a reagent comprising a complex-forming salt of a heavy metal of Groups I and II of the periodic system to form in admixture the solid complex compounds of said metal salt and said aliphatic conjugated diolefin and cyclic olefin by a thermally reversible reaction, wherein said solid complex compounds exhibit differing degrees of thermal stability depending upon the structure and degree of saturation of the hydrocarbon component thereof, the step of separating the aliphatic conjugated diolefin and the cyclic olefin components from the resulting mixture of said solid complex compounds by fractionally decomposing said mixture at a series of successively higher temperature levels between the temperature of initial complex decomposition and the temperature of substantially complete hydrocarbon evolution, and segregating the hydrocarbons evolved at each of said successively higher temperature levels.

3. A process for the separation of aliphatic diolefins and cyclic olefins from hydrocarbon mixtures containing the same which comprises contacting said hydrocarbon mixture with a cuprous halide reagent to precipitate as cuprous halide complex compounds the hydrocarbons capable of forming insoluble complexes, separating the precipitated complexes from unreacted hydrocarbons, fractionally decomposing the complexes by heating the same at a series of successively higher temperature levels from the temperature of initial complex decomposition to the temperature of substantially complete hydrocarbon evolution, segregating the hydrocarbons evolved at each of said temperature levels, recovering cyclic olefins from the decomposition of the complexes of less thermal stability, and recovering aliphatic diolefins from the decomposition of the complexes of greater thermal stability.

4. A process for the separation of aliphatic diolefins from hydrocarbon mixtures containing the same along with cyclic olefins which comprises contacting said hydrocarbon mixture with an excess of cuprous halide to precipitate as cuprous halide complex compounds the hydrocarbons capable of forming insoluble complexes, separating the precipitated complexes from unreacted hydrocarbons, fractionally decomposing the complexes by heating the same at a series of successively higher temperature levels beginning at a temperature of about 125° F. and continuing to a temperature of at least about 175° F., segregating the hydrocarbons evolved at each of said successive temperature levels, and recovering predominantly aliphatic diolefins at the temperature levels of at least about 175° F.

5. A process according to claim 3 in which the cyclic olefin is cyclopentene and the aliphatic diolefin is piperylene.

6. A process according to claim 3 in which the cuprous halide reagent is an aqueous solution of cuprous chloride.

7. A process for the separation of aliphatic diolefins and cyclic olefins from hydrocarbon mixtures containing the same which comprises contacting said hydrocarbon mixture at a temperature below about 80° F. with a cuprous chloride reagent to precipitate said diolefins and cyclic olefins as insoluble cuprous chloride complexes, separating the precipitated complexes from unreacted hydrocarbons, and fractionally decomposing the complexes by heating the same at a series of successively higher temperature levels to effect at least partial segregation of said cyclic olefins and said aliphatic diolefins one from the other and free from other hydrocarbons.

LLOYD C. MORRIS.